United States Patent Office 2,700,664
Patented Jan. 25, 1955

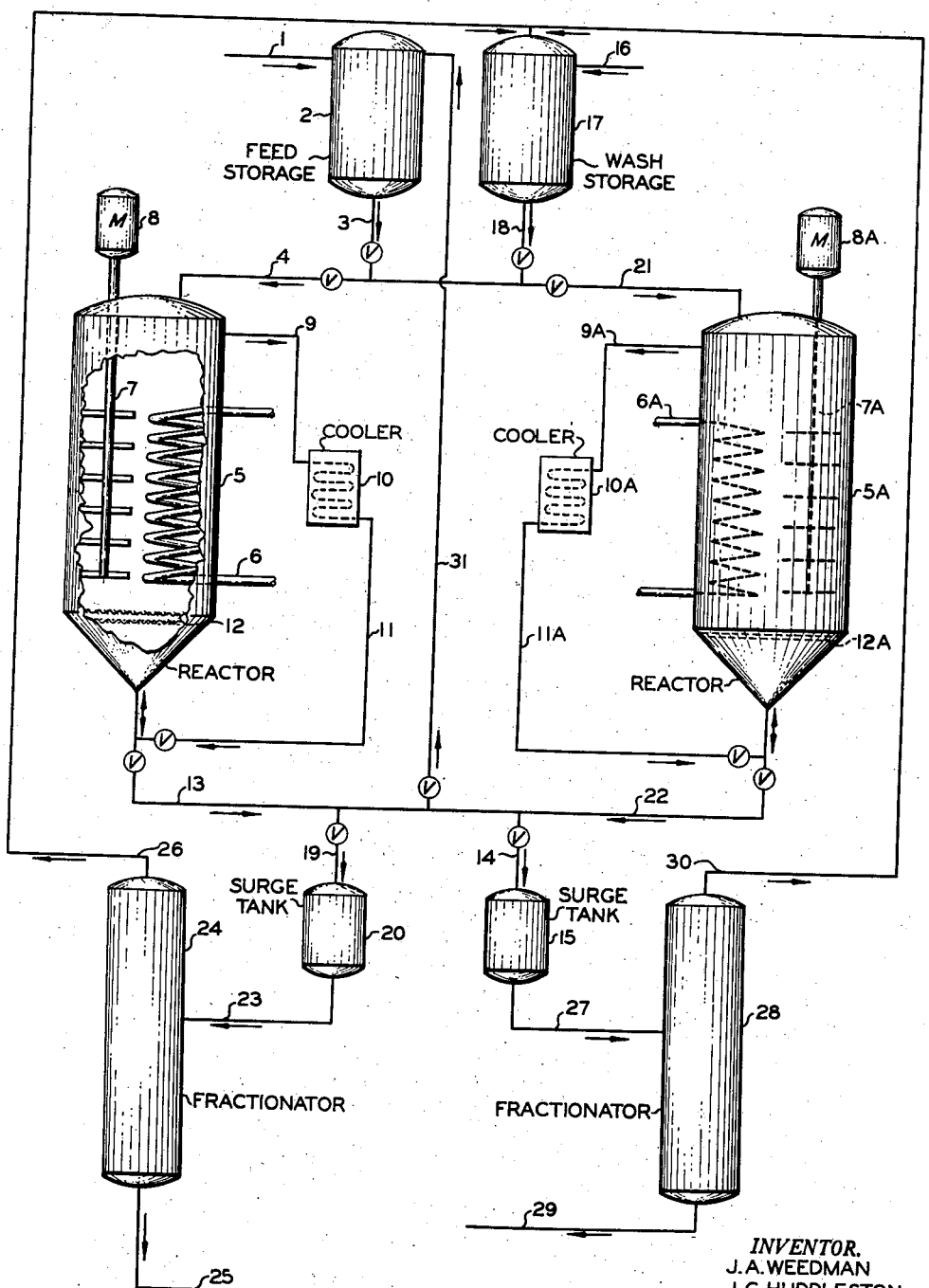

2,700,664

SEPARATION OF ORGANIC COMPOUNDS BY ADDUCT FORMATION

John A. Weedman and James G. Huddleston, Bartlesville, Okla., assignors to Phillips Petroleum Company, a corporation of Delaware Application November 17, 1950, Serial No. 196,250

3 Claims. (Cl. 260—96.5)

This invention relates to a process for the separation of organic compounds. In one of its aspects, this invention relates to a process for the separation of hydrocarbons characterized by straight carbon atom chains from admixture with other hydrocarbons by formation of adducts of the former with urea. In another of its aspects, this invention relates to a process for the separation of hydrocarbons characterized by branched carbon atom chains from admixture with other hydrocarbons characterized by straight carbon atom chains by formation of adducts of the former with thiourea.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B. P. 125.6° C.) cannot be economically separated from 2,2,4-trimethylhexane (B. P. 125.5° C.) because of the small difference in boiling points. Such a separation is often desirable as, for example, in a gasoline manufacturing process in order to improve the octane rating of the gasoline by removal of the low octane straight-chain hydrocarbons therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof.

While urea forms adducts with organic compounds having straight carbon atom chains, thiourea ($CS(NH_2)_2$) forms adducts with organic compounds having branched or cyclic carbon atom chains. Thus, the adduct-forming property of thiourea permits a ready separation of such organic compounds from organic compounds having straight carbon atom chains, since the latter do not form adducts with thiourea.

Most of the methods employed to effect the adduct-forming reactions discussed above are quite suitable in small-scale laboratory work, but they are not readily adaptable to commercial processes. For example, the reactions can be effected in batchwise operations, but continuous operations are usually preferred in commercial practice. Also, it has been suggested that the mixtures to be resolved be contacted with a moving bed of the solid amide, but formation of the adducts tends to plug up the bed, and the attendant operating difficulties are obvious. Also, in presently known processes adducts are separated from accompanying liquids and then it is necessary to decompose the adduct in order to recover or to regenerate the organic compounds therefrom. In many instances this involves transporting solid adducts from a separating device, such as a filter press, to a decomposition zone, and such a step also presents problems that cannot readily be solved efficiently and economically. Our invention avoids many of the difficulties encountered in the prior art in carrying out such a separation process.

It is an object of this invention to provide a novel process for the separation of organic compounds.

It is another object of this invention to provide a novel process for the separation of organic compounds having a straight chain of carbon atoms from branched-chain and/or cyclic organic compounds by formation of adducts of the former with urea.

It is another object of this invention to provide a novel process for the separation of organic compounds having a branched or a cyclic carbon atom chain from straight-chain organic compounds by formation of adducts of the former with thiourea.

It is another object of this invention to provide a novel manner for carrying out such a process wherein the adduct-forming reaction, separation of the adduct from the reaction mixture, decomposition of the adduct, and separation of the resulting liquid organic compounds from solid amide are effected in a single vessel or zone.

It is a further object of this invention to employ a series of batchwise operations for such a separation process in a commercially useful manner to produce continuously desired products of the separation.

It is a further object of this invention to eliminate difficulties usually encountered in prior art processes.

Further and additional objects of our invention will be apparent from the discussion and disclosure of our invention hereinbelow.

We have found that a mixture of liquid organic compounds containing at least one compound reactive with an amide selected from the group consisting of urea and thiourea to form a solid addition product therewith and containing at least one compound non-reactive with the same amide can be resolved by charging the amide to a reaction vessel containing a fixed filter element in the bottom, passing mixture to be resolved into contact with said amide, preferably with agitation of the reaction mixture, to form a slurry of solid addition products of the amide and the compounds reactive therewith and non-reactive compounds of the feed mixture, withdrawing compounds non-reactive with the amide from the reaction vessel through the filter element while retaining solid addition products therein, decomposing solid addition products in the reaction vessel by adding to the reaction vessel as a decomposing medium an organic compound non-reactive with the amide and readily separable from the components of the mixture being resolved and heating the resulting slurry to a temperature not below the decomposition temperature of the addition products, and withdrawing liquid organic compounds reactive with the amide and decomposing medium from the reaction vessel through the filter element while retaining solid amide therein. The amide is then ready for further use in similar separation processes. Thus, the entire separation process can be effected in a single reaction vessel or zone, but in order to provide a continuous stream of separation products at least two or a plurality of such zones are employed. Thus, while one or more reaction vessels are on the cycle wherein the solid addition products are being formed, one or more vessels are on the cycle wherein the addition products are being decomposed. If sufficient reaction vessels are employed, one or more vessels can be on the cycle wherein liquid organic compounds non-reactive with the amide are being separated from the solid addition products and on the cycle wherein liquid organic compounds reactive with the amide are being separated from the amide. In this manner, there is a continuous production of separation products in a process having practical and commercial value.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound with urea and a solvent to be discussed hereinafter with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including petacontane; and the straight-chain olefins containing from six to fifty carbon atoms, for example, the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly they can be readily separated from branched-chain or cyclic hydrocarbons that do not form adducts with urea. Additionally, derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily the various substituent groups set forth above are attached to one of the two end carbon atoms in the unbranched carbon chain of six to fifty carbon atoms. However, when fluorine atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms that do not form adducts with thiourea. Thus, with thiourea branched-chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, ethyl heptane and other alkyl paraffins as well as methyl propene, the methyl butenes, di-, tri-, and tetramethyl butenes, the methyl pentenes, the ethyl pentenes, trimethyl pentenes, diethyl pentene and other branched-chain olefins including higher molecular weight olefins, for example, methyl, ethyl, propyl and butyl derivatives of hexadecene, docosene and pentacontene, will form adducts with thiourea. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as the oxygenated derivatives of terpenes, such as camphor, borneol, fenchone, and the like.

The urea adducts discussed above contain more than three mols of urea per mol of organic compound, and the thiourea adducts contain more than two mols of thiourea per mol of organic compound.

In the adduct-forming reaction solvent-activators may, or may not, be used. In some instances, it is preferred not to use a solvent-activator in order that the problems of recovering the products resulting from the separation of the feed mixture are minimized. However, it is usually desirable to employ a solvent-activator since it reduces the reaction time for the adduct-forming reaction. Suitable solvent-activators are oxygenated hydrocarbon derivatives such as methanol, ethanol, low-boiling ketones, secondary butyl alcohol, and the like. Water is also a solvent-activator and in the copending application of Ackerman Serial No. 155,134, filed April 10, 1950, a number of nitrogen-containing compounds are listed as solvent-activators. The amount of solvent-activator that is employed is variable over wide limits. For example, only sufficient solvent-activator to wet the amide, but insufficient to form a separate filterable, liquid phase, may be used in some operations. On the other hand, if desired, sufficient solvent activator may be employed to form a saturated or unsaturated solution of amide in the solvent-activator.

The temperature at which the adducts are formed is usually not above 175° F. The actual temperature employed is dependent upon the organic compounds entering into the adduct with the amide since the thermal stability of the adducts is dependent upon the number of carbon atoms in the organic compound. In general, the reaction temperature is below the decomposition temperature of the adducts to be formed, and it has been found that a temperature of 60 to 80° F. is preferred for the adduct-forming reaction. However, if desired, higher and lower temperatures may be used. In forming the adduct a molar ratio of urea to organic compound within the range of 1:1 to 100:1 is employed. The temperature at which the adducts are decomposed is also dependent upon the organic compound in the adducts with the amide, and it is essential that the temperature be not below the decomposition temperature of the particular adducts. In general, the decomposition temperature is above the temperature at which the adducts are formed, and in most cases, a temperature of 80 to 280° F. is quite suitable.

We will describe our invention in further detail by referring to the accompanying drawing which represents one manner in which our invention can be practiced. We will employ this drawing to describe a process wherein a mixture of straight-chain and branched-chain paraffinic hydrocarbons are resolved, but from the discussion above, it will be quite apparent that other mixtures can be resolved in the same manner. In the accompanying drawing, we have not included conventional equipment, such as pumps, compressors, temperature and pressure control equipment, and the like, but it will be obvious to those skilled in the art that the inclusion of such equipment is within the scope of our invention.

Referring to the accompanying drawing a feed mixture containing straight-chain paraffinic hydrocarbons of at least six carbon atoms per molecule and iso-paraffinic hydrocarbons non-reactive with urea enters the system via line 1 and is thus passed to storage 2. From storage 2 the hydrocarbon mixture is withdrawn via line 3 and passed via line 4 to reactor 5. This reactor has been charged with solid urea wetted with no more than 15, preferably 5 to 10, weight per cent water, and it is equipped with heat exchange coils 6 and mixer or agitator 7 which is operated by motor 8. In reactor 5 the hydrocarbon feed and urea are contacted for a period of 1 to 60 minutes with agitation at a temperature of 60 to 80° F. The temperature is maintained within this range by the circulation of a suitable coolant, such as water or liquid hydrocarbon, through coils 6. Alternatively, the temperature in reactor 5 can be maintained within the desired range by removing a portion of the liquid therein via line 9. To separate accompanying adduct or urea from the liquid withdrawn via line 9 a small filter or fine wire screen can be placed in reactor 5 at the point where line 9 is joined to the reactor. The liquid thus withdrawn is passed through cooler 10 and thence via line 11 to reactor 5 where it serves to maintain the temperature within the desired range. This alternative method of operation is advantageous in that the cooled liquid being returned to the reactor aids in the agitation of the reaction mixture and it also aids in preventing the accumulation of an impervious layer of adduct on filter 12. At the conclusion of the reaction, isoparaffinic hydrocarbons are withdrawn from the reactor by suction, or other suitable means, through filter 12 which is fixed filter element containing a filtering cloth of iron, nickel or Monel wire or such wire interwoven with cotton duck, wool flannel, muslin or paper. The withdrawn hydrocarbons are passed via lines 13 and 14 to surge tank 15. After withdrawal of the isoparaffinic hydrocarbons, the adducts in the reactor are washed with a hydrocarbon non-reactive with urea at the conditions in reactor 5. The wash liquid enters the system via line 16 and storage 17, and it is passed to reactor 5 via lines 18 and 4. The wash liquid and adduct are agitated in reactor 5, and the wash liquid and isoparaffinic hydrocarbons washed from the adducts are then withdrawn through filter 12 and lines 13 and 14 to surge tank 15. Subsequently, an additional amount of wash liquid is passed from storage 17 to reactor 5. In the operation of our process, this wash liquid is preferably a hydrocarbon non-reactive with urea at the conditions in reactor 5, and it is more preferably a low-boiling hydrocarbon, for example, n-butane or n-pentane. Hereinafter we will refer to this hydrocarbon as n-pentane. The adducts and n-pentane are contacted with suitable agitation in reactor 5 at a temperature of about 175° F., at which temperature the adducts are decomposed and at a pressure sufficient to maintain the n-pentane in a liquid phase. The necessary heat for decomposing the adduct is supplied by circulation of a hot liquid or vapor, such as water or steam, through coils 6. At this temperature the adducts are decomposed, and the n-pentane and straight-chain paraffinic hydrocarbons are then separated from the urea by withdrawal through filter 12 and lines 13 and 19 to surge tank 20. Alternatively, the desired temperature in reactor 5 can be obtained by employing unit 10 as a heater and circulating a portion of the liquid in reactor 5 via line 9, unit 10, and line 11. This alternative method hinders the accumulation of an impervious layer of solid urea on filter 12. If it is difficult to remove the adduct from the filter element during either the adduct washing or adduct decomposition step, a portion of the n-pentane can be removed from the reactor via line 9 and passed via unit 10 and line 11 to the bottom of the reactor. This n-pentane passes upwardly through the filter element and aids in suspending the adduct in the n-pentane.

At the conclusion of the adduct-forming reaction in reactor 5, and while the adduct in reactor 5 is being washed and decomposed, feed from storage 2 is passed via line 21 to reactor 5A which is similar to reactor 5. Reactor 5A is equipped with coils 6A, agitator 7A operated by motor 8A, and it is also provided with filter 12A. It is provided with lines 9A and 11A and cooler 10A which serves the same purpose as lines 9 and 11 and cooler 10 as already described with respect to reactor 5. Reactor 5A is on the adduct-forming cycle while reactor 5 is on the adduct decomposition cycle, and consequently, continuous streams are provided to the fractionators to be discussed hereinbelow, and in this manner, there is a continuous production of products. Isoparaffinic hydrocarbons and any n-pentane are withdrawn from reactor 5A via lines 22 and 14 and thus passed to surge tank 15. After decomposition of the adducts in reactor 5A in the same manner as that described for reactor 5, n-pentane and straight chain paraffinic hydrocarbons, resulting from decomposition of the adducts, are passed via lines 22 and 19 to tank 20.

From tank 20 hydrocarbons are passed to fractionator 24 via lines 23, and straight-chain paraffinic hydrocarbons resulting from decomposition of the adduct are withdrawn from the system via line 25 as products of the process. n-Pentane is taken overhead from fractionator 24 and returned to storage 17 via line 26. From surge tank 15 n-pentane and isoparaffinic hydrocarbons are passed via line 27 to fractionator 28 from which isoparaffinic hydrocarbons are withdrawn via line 29 as products of the process. n-Pentane from fractionator 28 is taken overhead and recycled to storage 17 via line 30.

If the feed mixture to be resolved contains a relatively high concentration of straight-chain paraffinic hydrocarbons, a portion of the isoparaffinic hydrocarbons passing via lines 13 and 22 is returned to storage 2 via line 31. The isoparaffinic hydrocarbons thus recycled act as a diluent in reactors 5 and 5A, and in this manner, they improve the mixing of the urea and hydrocarbon mixture to be resolved.

In another aspect of our invention a portion of the hydrocarbons passing via line 25 is used as a medium for decomposing the adducts in reactors 5 and 5A. After the adducts have been washed with n-pentane, the hydrocarbons passing via line 25 are returned to the reactor, and the resulting mixture is then heated to a temperature at which the adduct decomposes. Subsequently, the hydrocarbons are removed from the reactor, as already described, as a product of the process, and, if desired, the hydrocarbons are fractionated or otherwise treated to remove n-pentane that remained occluded upon the adduct after the washing thereof. Also, in our process we have found it advisable to decompose the adduct incompletely in order that the urea remaining in the reactor after removal of the hydrocarbons contains a small amount of adduct. The presence of the adduct shortens, and sometimes eliminates, any induction period for the adduct-forming reaction after feed mixture is brought into contact with the urea as previously described. Thus, when decomposing the adduct in our process, we prefer to decompose from 95 to 99 per cent of the adduct and to leave the undecomposed adduct in the reactor with the urea for further use in the process.

Our process possesses some important advantages over prior art processes. For example, in our process all liquid-solid separation steps are effected in the reactor, and we are not confronted with any problem of transporting solids. Also, the separation process, although involving several steps, is effected in a single reactor or a series of reactors. Furthermore, by the use of a plurality of reactors in our process continuous streams of product are produced, thus increasing the commercial desirability of our process. Other advantages and modifications of our invention will be apparent to those skilled in the art without exceeding the scope and spirit of our invention.

We claim:

1. An improved process for the fractionation of a liquid mixture of organic compounds containing a straight chain fraction and a non-straight chain fraction comprising introducing said mixture into a reaction vessel containing a solid amide selected from the group consisting of urea and thiourea, said vessel having a filtration zone in the lower portion thereof, agitating the contents of the vessel for a time sufficient for the amide to form an adduct with one of the fractions of said mixture, the formation of said adduct being an exothermic reaction; during the course of said reaction withdrawing from the upper part of the reaction vessel a portion of the liquid mixture, cooling said withdrawn portion, returning it to the base of said vessel and passing it upwardly through said vessel, whereby the vessel temperature is held below the adduct decomposition temperature, additional agitation of the reaction mixture is effected, and the accumulation of an impervious layer of adduct over the filtration zone is prevented; filtering from the adduct that fraction non-reactive with the amide and discharging said fraction into a separate receiving zone, the adduct being retained as residue in the reaction vessel, washing the adduct free of adhering liquid, thermally decomposing all but a small portion of the washed adduct, thereby liberating the amide from the organic fraction combined therewith, filtering off said fraction from the amide and discharging it into a second receiving zone while retaining the solid amide within the reactor in condition for another cycle of adduct formation; the aforesaid sequence of adduct formation, adduct washing, and adduct decomposition, as well as the filtration step following each of said operations, being performed in the reaction vessel.

2. An improved process for the separation of the straight chain fraction from a mixture containing straight chain hydrocarbons of 6 to 50 carbon atoms and branched chain hydrocarbons comprising: introducing said mixture in liquid form into a reaction vessel containing solid urea and having a filtration zone positioned in the lower portion thereof, agitating the contents of the vessel for a time sufficient for the straight chain hydrocarbon to form an adduct with the urea, maintaining the reaction temperature at about room temperature by continuously withdrawing a portion of the liquid content of the vessel from the upper part thereof, cooling it, injecting it into the base of the reaction vessel, and passing it upwardly through said vessel, whereby additional localized agitation of the reaction mixture is effected and at the same time accumulation of an impervious layer of adduct over the filtration zone is prevented; filtering from the adduct the branched chain fraction of the feed and discharging it into a first receiving zone, the adduct being retained in the reaction vessel, washing the adduct free of adhering liquid with n-pentane, filtering the wash liquid from the adduct and discharging said wash liquids into said first receiving zone, thermally decomposing from 95 to 99 per cent of the washed adduct in the presence of additional n-pentane, filtering from the urea the n-pentane and the straight chain fraction liberated from the urea, and discharging the mixture into a second receiving zone, leaving the solid urea in the reaction vessel and separately fractionating the contents of both receiving vessels to separate the n-pentane therefrom; the aforesaid sequence of adduct formation, adduct washing and adduct decomposition, as well as the filtration step following each of said operations, being performed in the reaction vessel.

3. An improved process for the separation of the straight chain fraction from a mixture containing straight chain hydrocarbons of 6 to 50 carbon atoms and branched chain hydrocarbons comprising: introducing said mixture in liquid form into a reaction vessel containing solid urea and having a filtration zone positioned in the lower portion thereof, agitating the contents of the vessel for a time sufficient for the straight chain hydrocarbon to form an adduct with the urea, maintaining the reaction temperature at about room temperature by continuously withdrawing a portion of the liquid content of the vessel from the upper part thereof, cooling it, injecting it into the base of the reaction vessel, and passing it upwardly through said vessel, whereby additional localized agitation of the reaction mixture is effected and at the same time accumulation of an impervious layer of adduct over the filtration zone is prevented; filtering from the adduct the branched chain fraction of the feed and discharging it into a first receiving zone, the adduct being retained in the reaction vessel, washing the adduct free of adhering liquid with n-pentane, filtering the wash-liquid from the adduct and discharging said wash liquid into said first receiving zone, thermally decomposing from 95 to 99 per cent of the washed adduct by heating it to an adduct-decomposition temperature in the presence of a portion of the straight chain hydrocarbon fraction from a previous separation process, filtering this from the urea along with the hydrocarbon fraction liberated in the course of adduct decomposition; discharging the combined mixture into a second receiving zone, leaving the solid urea in the reaction vessel; and fractionating the contents of said first receiving vessel to separate the n-pentane therefrom; the aforesaid sequence of adduct formation, adduct washing, and adduct decomposition, as well as the filtration step following each of said operations, being performed in the reaction vessel.

References Cited in the file of this patent

UNITED STATES PATENTS

| Number | Name | Date |
|---|---|---|
| 2,336,643 | Schulze | Dec. 14, 1943 |
| 2,386,300 | Drennan et al. | Oct. 9, 1945 |
| 2,386,352 | Schulze | Oct. 9, 1945 |
| 2,401,114 | Schulze et al. | May 28, 1946 |
| 2,499,820 | Fetterly | Mar. 7, 1950 |
| 2,549,372 | Fetterly | Apr. 17, 1951 |
| 2,569,984 | Fetterly | Oct. 2, 1951 |
| 2,577,202 | Lien et al. | Dec. 4, 1951 |
| 2,596,344 | Newey et al. | May 13, 1952 |

OTHER REFERENCES

Australian application 17,339/47, available February 12, 1948.